US009541576B2

(12) United States Patent
Kalinin et al.

(10) Patent No.: US 9,541,576 B2
(45) Date of Patent: Jan. 10, 2017

(54) ELECTROCHEMICAL FORCE MICROSCOPY

(71) Applicant: UT-Battelle, LLC, Oak Ridge, TN (US)

(72) Inventors: Sergei V. Kalinin, Knoxville, TN (US); Stephen Jesse, Knoxville, TN (US); Liam F. Collins, County Galway (IE); Brian J. Rodriguez, Dublin (IE)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

(21) Appl. No.: 14/810,605

(22) Filed: Jul. 28, 2015

(65) Prior Publication Data

US 2016/0025773 A1 Jan. 28, 2016

Related U.S. Application Data

(60) Provisional application No. 62/029,704, filed on Jul. 28, 2014.

(51) Int. Cl.
*G01Q 60/60* (2010.01)
(52) U.S. Cl.
CPC ................. *G01Q 60/60* (2013.01)
(58) Field of Classification Search
CPC ......... G01Q 60/60; G01Q 30/12; G01Q 30/14
USPC ....................................... 850/7, 51
See application file for complete search history.

(56) References Cited

U.S. PATENT DOCUMENTS

| | | | |
|---|---|---|---|
| 5,495,109 A | 2/1996 | Lindsay et al. | |
| 6,002,131 A | 12/1999 | Manalis et al. | |
| 8,037,739 B2 | 10/2011 | Ota et al. | |
| 2008/0297880 A1* | 12/2008 | Steckl | G02B 26/004 359/291 |
| 2011/0271412 A1* | 11/2011 | Rychen | B82Y 35/00 850/21 |
| 2012/0066799 A1* | 3/2012 | Esch | G01Q 10/06 850/1 |

(Continued)

FOREIGN PATENT DOCUMENTS

| | | | | |
|---|---|---|---|---|
| JP | 5269725 | 8/2013 | | |
| JP | EP2757380 A1 * | 7/2014 | ............ | B82Y 35/00 |
| WO | 2011/128694 | 10/2011 | | |

OTHER PUBLICATIONS

Black, J., et al., "Bias-Dependent Molecular-Level Structure of Electrical Double Layer in Ionic Liquid on Graphite", Nano Lett., 2013, 13 (12), pp. 5954-5960.

(Continued)

*Primary Examiner* — Jason McCormack
(74) *Attorney, Agent, or Firm* — Warner Norcross & Judd LLP

(57) ABSTRACT

A system and method for electrochemical force microscopy are provided. The system and method are based on a multidimensional detection scheme that is sensitive to forces experienced by a biased electrode in a solution. The multidimensional approach allows separation of fast processes, such as double layer charging, and charge relaxation, and slow processes, such as diffusion and faradaic reactions, as well as capturing the bias dependence of the response. The time-resolved and bias measurements can also allow probing both linear (small bias range) and non-linear (large bias range) electrochemical regimes and potentially the de-convolution of charge dynamics and diffusion processes from steric effects and electrochemical reactivity.

20 Claims, 5 Drawing Sheets

(56) References Cited

U.S. PATENT DOCUMENTS

2012/0125783 A1     5/2012   Kalinin et al.
2013/0232648 A1     9/2013   Fukuma et al.
2014/0223614 A1*   8/2014   Fukuma ................ B82Y 35/00
                                                                                                                  850/1

OTHER PUBLICATIONS

Brucker Corporation, "Scanning Electrochemical Potential Microscopy (SECPM)", downloaded from http://www.brucker.com/products/surface-analysis/atomic-force-microscopy/modes/modes- . . . on Jan. 24, 2014, p. 1.
Hayes, R., et al., "Double Layer Structure of Ionic Liquids at the Au(111) Electrode Interface: An Atomic Force Microscopy Investigation", J. Phys. Chem. C, 2011, 115(14), pp. 6855-6863.
O'Shea, S.J., "Atomic Force Microscopy of Local Compliance at Solid-Liquid Interfaces", Chemical Physics Letters, vol. 223, Issue 4, Jun. 24, 1994, pp. 336-340.
Ramdon, S., et al., "In Situ Electrochemical Studies of Lithium-Ion Battery Cathodes Using Atomic Force Microscopy", Journal of Power Sources, vol. 249, Mar. 1, 2014, pp. 373-384.
Smith, E., et al., "Time Resolved in Situ Liquid Atomic Force Microscopy and Simultaneous Acoustic Impedance Electrochemical Quartz Crystal Microbalance Measurements: A Study of Zn Deposition", Anal. Chem., 2009, 81 (20), pp. 8466-8471.

\* cited by examiner

Fig. 5(a)
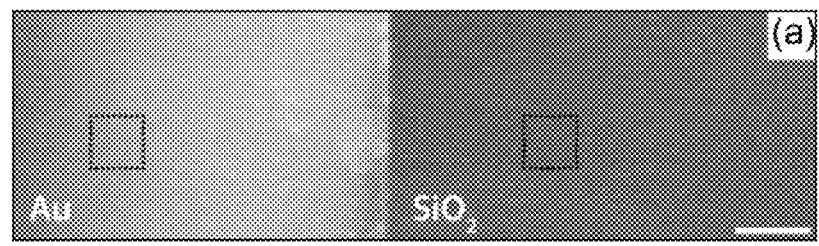
Fig. 5(b)
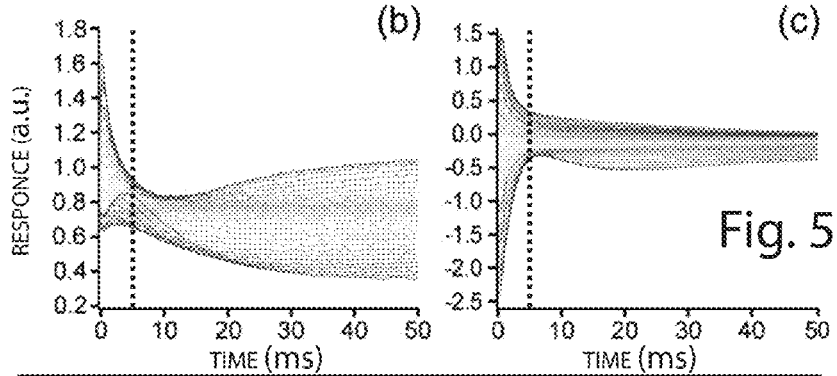
Fig. 5(c)
Fig. 5(d)
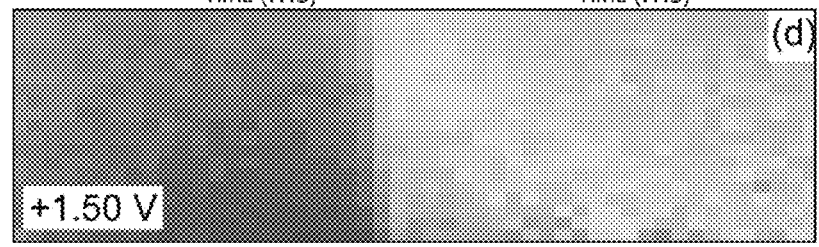
Fig. 5(e)
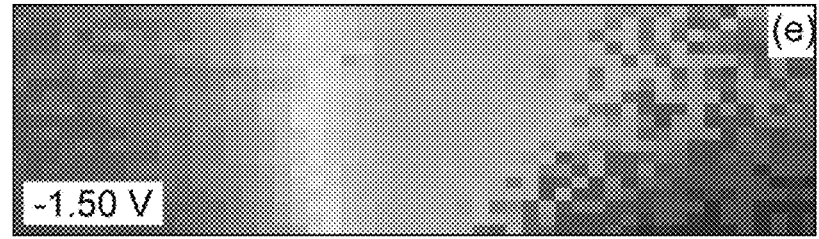

ELECTROCHEMICAL FORCE MICROSCOPY

CROSS-REFERENCE TO RELATED APPLICATIONS

This application claims the benefit of U.S. Provisional Application 62/029,704, filed Jul. 28, 2014, the disclosure of which is hereby incorporated by reference in its entirety.

STATEMENT REGARDING FEDERALLY SPONSORED RESEARCH AND DEVELOPMENT

This invention was made with government support under Contract No. DE-AC05-00OR22725 awarded by the U.S. Department of Energy. The government has certain rights in the invention.

BACKGROUND OF THE INVENTION

The present invention relates to systems and methods for the mapping of electronic, ionic, and electrochemical processes at a solid-liquid interface.

Understanding the local electrostatic, electrochemical, and double layer ion distribution at the solid-liquid interface is important in the study of corrosion, sensing, energy storage, and biological processes. These phenomena are governed by charge transport, diffusion, and electrostatic screening by mobile charge species from a bulk electrolyte, as well as a diverse set of electrochemical reactions at the solid-liquid interface. Understanding such complex processes requires techniques capable of mapping with a lateral resolution below the micron level. Traditional microscopic electrochemical methods based on current measurements in the time-domain or the frequency-domain do not allow measurements significantly below a fabricated device level, however. To date, scanning electrochemical microscopy (SECM)[1] is the standard in measuring the local electrochemical behavior at solid-liquid interfaces. The spatial resolution of SECM requires the use of an ultra-micro electrode probe that limits the achievable resolution to micron scales, much larger than those achievable using standard scanning probe microscopy (SPM) techniques.

In ambient or vacuum environments, SPM techniques based on force detection can lead to a significant improvement over current based detection. For example, electrochemical strain microscopy (ESM) is capable of probing electrochemical reactivity and ionic flows in solids with nanometer resolution. Kelvin probe force microscopy (KPFM) is another example, widely used for the measurement of the surface potential distribution at gas-solid interface. Force based detection offers several major advantages over current detection based technologies: (a) the resolution to probe nanometer-scale volumes, (b) significantly improved sensitivity (i.e., enhanced signal to noise ratio), and (c) spectroscopy imaging capabilities. However, in order to gain an understanding of the local electrostatic, electrochemical, and double layer ion distribution, force based SPM techniques must be extended to the solid-liquid interface.

To date, KPFM is only operational under vacuum or ambient environments and in non-polar liquids. KPFM operation in polar liquids is complicated by the presence of mobile ions, preventing measurements under conditions relevant for biological or energy research, for example. The present application provides an SPM strategy to probe charge dynamics and electrokinetic phenomena in a technique referred to herein as electrochemical force microscopy. As discussed herein, electrochemical force microscopy can provide quantitative force-based electrochemical measurements of complex electrochemical reactions at the solid-liquid interface.

SUMMARY OF THE INVENTION

A system and method of electrochemical force microscopy is provided. The system and method are based on a multidimensional detection scheme that is sensitive to forces experienced by a biased SPM probe in a solution. The multidimensional (time and bias) approach allows separation of fast processes, such as double layer charging and charge relaxation, and slow processes, such as diffusion and faradaic reactions. The time-resolved and bias measurements can also allow probing both linear (small bias range) and non-linear (large bias range) electrochemical regimes and potentially the de-convolution of charge dynamics and diffusion processes from steric effects and electrochemical reactivity.

In one embodiment, a method for electrochemical force microscopy includes detecting electrostatic and electrochemical forces acting on a voltage modulated SPM tip in close proximity to a sample surface. The SPM tip is separated by a distance from a sample material through a solution, and an electrical potential is established between the tip and the sample material. The electrical potential results from an excitation signal applied to either of the SPM tip or the sample material. The excitation signal includes a probing waveform component and an excitation waveform component superimposed thereon. The force response is then measured, including the bias and time dependent force response of the SPM tip.

In one embodiment, the probing waveform component is selected to induce slow electrochemical responses at the solid-liquid interface. The probing waveform component can include a unipolar triangle wave, a bipolar triangle wave, a sinusoidal wave, a linear sweep, a unipolar first order reversal curve, or a bipolar first order reversal curve, for example. The excitation waveform component is a periodic waveform that is superimposed on the probing waveform component to elicit a dynamic response at the solid-liquid interface, allowing the detection of the high frequency responses, for example, fundamental and harmonic responses. The excitation signal is applied to the SPM tip or the sample material.

In another embodiment, a system for mapping dynamic charge screening, ionic diffusion, or electrochemical reactivity comprising is provided. The system includes a signal generator, an electrode separated by a distance from a sample material, and a force detection sensor. The signal generator is operable to provide an excitation signal to the electrode, and the force detection sensor is operable to measure the bias and time dependent force response. The electrode can include a cantilever and a current conductive tip separated from the sample material through an electrolyte liquid, and the force detection sensor can include an optical detector to detect cantilever deflections.

In these and other embodiments, the local force response can be presented as a function of time for each bias applied. The electrode can concentrate an electric field at its apex as a conducting cantilever with a conducting tip. The electrode can also include electrochemically inert graphene probes, electrochemically shielded probes, and high frequency probes. Measurements can also be performed in an electrochemical cell including counter and reference electrodes in various configurations with the tip or the sample acting as the working or passive electrode.

The system and method of the present invention can therefore probe local bias- and time-resolved ion dynamics and electrochemical processes at the solid-liquid interface. The system and method of the present invention can also be used to investigate charge screening mechanisms and electrochemical reactions in the probe-sample junction. The system and method are also suitable in a force-based imaging mode, allowing visualization of the spatial variability of sample-dependent local electrochemical properties.

These and other features and advantages of the present invention will become apparent from the following description of the invention, when viewed in accordance with the accompanying drawings and appended claims.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

BRIEF DESCRIPTION OF THE DRAWINGS

FIGS. 5(a)-5(e) illustrate two-dimensional electrochemical force microscopy images of the boundary between an Au sample and a SiO$_2$ sample in water.

DESCRIPTION OF THE CURRENT EMBODIMENTS

Figure 1:
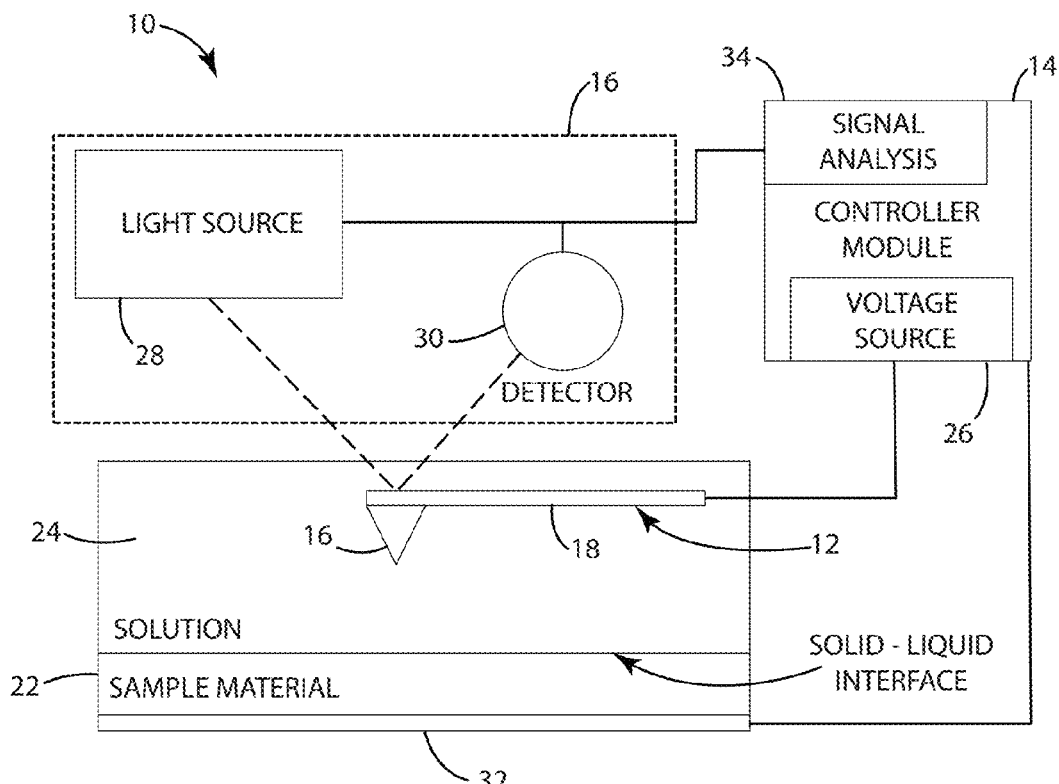
FIG. 1 is an electrochemical force microscopy system in accordance with a current embodiment.
Figure 2A:
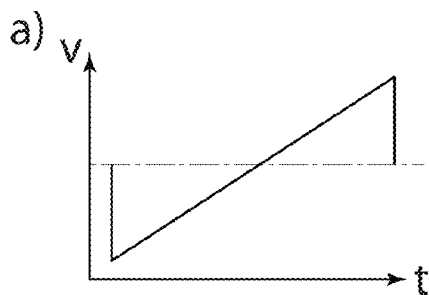
FIGS. 2(a)-2(d) illustrate example probing waveforms for inducing slow electrochemical responses using the system of FIG. 1.
Figure 2B:
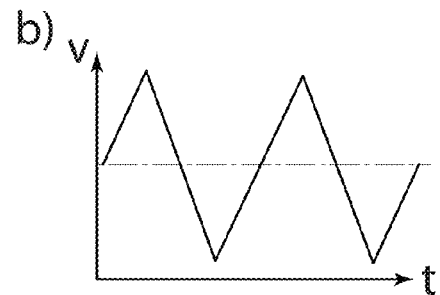
Figure 2C:
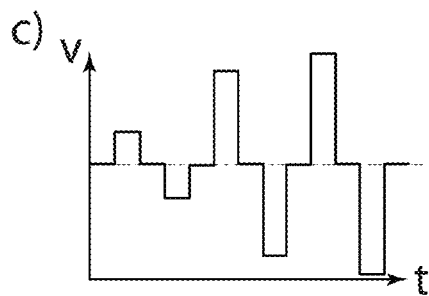
Figure 2D:
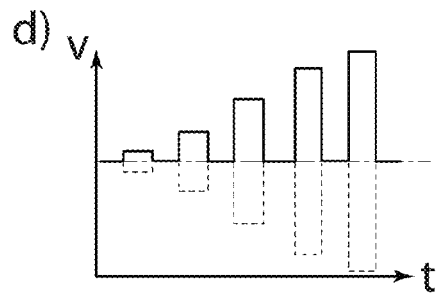

The current embodiments relate to a system and a method for electrochemical force microscopy. The system and method are based on a multidimensional detection scheme that is sensitive to forces experienced by a biased probe in a solution. The multidimensional approach allows separation of fast processes, such as double layer charging, and charge relaxation, and slow processes, such as diffusion and faradaic reactions, as well as capturing the bias dependence of the response. The time-resolved and bias measurements can also allow probing both linear and non-linear electrochemical regimes and potentially the de-convolution of charge dynamics and diffusion processes from steric effects and electrochemical reactivity.

To assist in an understanding of the current embodiments, a brief discussion of the interactions at the solid-liquid interface is set forth. In polar liquids, the presence of mobile ions in a voltage modulated SPM measurement will influence the interactions between both the tip- and cantilever-sample and the response will depend strongly on the relaxation processes associated with the motion of the ions and the formation of electric double layers. As described by Bazant et al.[2], the formation of the double layers at the electrode/liquid interfaces can be considered as the charging of two double layer capacitances in series having a relaxation time of $\tau_C=\lambda \cdot (L/2)/D$, where $\lambda$ is the Debye screening length, L is the electrode separation and D is ion diffusivity. The time constant of the diffusion of the ions from the bulk to the electrodes is given by $\tau_L=\lambda \cdot (L/2)^2/D$. A third relaxation process occurring in electrolytes is the charge relaxation due to electrolyte conduction, $\tau_L=\lambda^2/D$. This means that any attempt at implementing VM-SPM in liquid will be strongly affected by the different relaxation times associated with diffuse charge dynamics. The different relaxation times, however, present an opportunity to probe different electrochemical processes (double layer charging, bulk diffusion, steric effects, electrochemical (Faradaic) reactions) by choosing the appropriate excitation voltage frequency. At low frequencies, where all the tip and cantilever processes are fully equilibrated and double layer screening has been established, only responses due to electrochemical (Faradaic) processes will be detected by the SPM probe. At high frequencies, when the double layer charging and diffusion processes occur at a time scale much slower than the measurement, i.e., when the electrolyte behaves as a perfectly polarizable dielectric, the tip experiences only electrostatic interactions, making it possible to probe surface potentials and local dielectric properties. At intermediate frequencies, between static (equilibrium) and dielectric regimes, different electrochemical processes including double layer charging, charge relaxation and bulk diffusion can be probed between the tip and sample. In addition to the presence of relaxation processes with different timescales, the system response can be further complicated by the DC bias dependence of electrode processes, including ion crowding at the electrodes, nonlinear dielectric effects (e.g., dependence of the electrolyte dielectric constant and ion mobility on concentration), and ultimately electrochemical reactions at the electrodes at larger biases, an understanding of which is critical, particularly in systems involving polarized electrodes such as in energy storage devices.[3,4]

To further assist in an understanding of the current embodiments, several terms are defined herein. The term "excitation signal" includes an electrical signal to induce a local response and can include an excitation waveform component and a probing waveform component. The term "excitation waveform component" includes a periodic waveform to elicit a fast electrochemical response, including for example double layer charging and charge relaxation. The term "probing waveform component" includes a carrier waveform having a time-varying magnitude and having a relatively low frequency to elicit a slow electrochemical response, including for example diffusion and faradaic reactions. The probing waveform component biases the excitation waveform component by an amount equal to the magnitude of the probing waveform component. Example probing waveforms include, without limitation, a unipolar triangle wave, a bipolar triangle wave, a sinusoidal wave, a linear sweep, a unipolar first order reversal curve, and a bipolar first order reversal curve. The term "bias response" includes the force response induced as a function of the bias (e.g., magnitude) of the probing waveform, typically measured as an electrical output. The term "time response" includes the force response elicited as a function of time, typically measured as an electrical output. The term "dynamic response" is a response that varies as a function of bias, time, or both bias and time. In addition, within this application several publications are referenced by Arabic numerals, or principal author's name followed by year of publication, within parentheses or brackets. Full citations for these publications are found under the section heading References. The disclosures of all these publications in their entireties are hereby expressly incorporated by reference herein.

Referring now to FIG. 1, an electrochemical force microscopy system is depicted and generally designated 10. The system 10 includes an electrode 12, a controller module 14, and a force detection sensor 16. The electrode 12 includes a current conductive cantilever 18 and a current conductive tip 20. The tip 20 is spaced apart from the sample material 22 through a liquid 24, for example an electrolyte solution. The controller module 14 includes a signal generator 26 in electrical communication with the cantilever 18. The controller module 14 can include a commercial product, including for example a Nanonis control system from SPECS Zurich GmbH. The force detection sensor 16 adapted to measure the local force response of the cantilever 18 for output to the controller module 14. The force detection sensor 16 can include a force detection sensor 16 utilized in atomic force microscopy (AFM), for example a commercial AFM system from Bruker Corporation or from Keysight Technologies. As shown in FIG. 1, the force detection sensor 16 includes a light source 28 such as a laser diode that generates a beam of light that is directed towards the cantilever 18 and reflected towards a detector 30, such as a four-quadrant photodetector. The reflected beam contains information regarding the deflection undergone by the cantilever 18, and by extension the forces on the cantilever 18. Other force detection sensors can be based on piezoresistive, piezoelectric, capacitive, MOSFET, tuning fork, or double tuning fork techniques, for example. An optional bottom electrode 32 is connected to the sample material 22 and connected to the controller module 14 for electrochemical analysis as set forth in U.S. Pat. No. 8,752,211 to Kalinin et al, the disclosure of which is incorporated by reference in its entirety.

As noted above, the electrode 12 is electively conductive, and generates an electric field to induce an electrochemical response. In particular, the electrode 12 concentrates an electric field at the apex of the conductive tip 16, positioned a defined distance above the sample surface 22. However, different tip materials can be used, including: (i) a probe formed of an electrochemically inert material (e.g., graphene), (ii) an electrochemically shielded probe, where a conductive cantilever is electrically insulated (e.g., parylene, $Si_3N_4$ coating) while the tip apex is exposed, confining the field to the area directly under the tip, leading to improved resolution, and (iii) high frequency probes (>MHz) to separate extremely fast processes (e.g., double layer charging).

Operation of the electrochemical force microscopy system 10 generally includes (a) applying an excitation signal to the electrode 12 or to the sample material 22 to establish an electrical potential between the electrode 12 and the sample material 22 and (b) measuring a force response induced on the electrode 12 by the electrical potential, the force response including the bias and time dependent local response of the electrode 12. Each operation is discussed separately below.

Applying the excitation signal generally includes generating a probing waveform for slow electrochemical responses and generating an excitation waveform for fast electrochemical responses. The probing waveform includes a bias, or magnitude, which varies over time to induce the desired electrochemical response in the system, causing a deflection in the cantilever 18. The probing waveform can take a number of forms designed to probe important mechanistic and kinetic information not obtainable using purely high frequency excitation. As shown in FIGS. 2(a)-2(d), the probing waveform can include a linear sweep, a bipolar triangle wave, a bipolar first order reversal curve, or a unipolar first order reversal curve. For linear sweep voltammetry, forward or reverse sweeps allow investigation of steady-state measurements and lead to the investigation of redox potential and kinetic parameters. For a bipolar triangle wave, the bias is swept in the forward and reverse directions for investigation into redox processes, heterogeneous electron-transfer reactions, and adsorption processes. For a first order reversal curve, a square wave waveform of increasing amplitude is useful for studying hysteretic behavior. The response in this example is recorded during both bias-on and bias-off states. For a unipolar first order reversal curve, a square wave waveform has a single polarity for investigation of anodic and cathodic responses separately. Other probing waveforms can be used in other embodiments as desired.

The excitation waveform component (also referred to as an AC voltage) is superimposed onto the probing waveform component to elicit a dynamic response in the system, allowing detection of the high frequency responses (e.g., fundamental and harmonic responses). The frequency of the excitation waveform component can be constant (amplitude or phase detection) or can be adjusted using the appropriate feedback loop to maintain the system at resonance. The amplitude of the excitation waveform component can be constant or can be adjusted using an additional feedback loop to establish a constant response signal amplitude. Numerous excitation and detection schemes are possible, including sinusoidal excitation, dual-AC excitation, frequency mixing, band excitation, and static deflection. Sinusoidal excitation includes single frequency excitation with the detection of fundamental response (at the frequency of the excitation waveform) and any/all harmonic amplitude responses. The fundamental and harmonic responses are detected using amplitude detection methods, however fundamental and harmonic responses can be detected in a frequency modulation mode in order to monitor changes in the mechanical response frequency of the cantilever 18 using phased locked loop or other suitable detection methods. Dual-AC (dual frequency) excitation around the cantilever resonance frequency can be used as a method of resonant frequency tracking based on amplitude detection, similar to the approach used for dual-AC resonance tracking piezo-response force microscopy[5]. Frequency mixing includes the application of two or more high frequency excitations to elicit mixing products, which can be detected in higher or lower frequency regimes, providing information on either linear or non-linear cantilever dynamics in a similar fashion to that used in scanning impedance microscopy[6] or intermodulation atomic force microscopy[7]. Band excitation[8] allows for the detection of the full cantilever response, enabling direct measurement of amplitude response, resonance frequency shift, and dissipation through determination of the Q-factor of the cantilever system. Harmonic responses can be further obtained according to the band excitation approach by using a half harmonic approach (or $1/n^{th}$ harmonic for higher harmonics)[9]. Static deflection can be detected directly via the photodetector deflection signal for both vertical and lateral deflection modes of cantilever bending.

The frequency of the excitation waveform component is generally greater than the frequency of the probing waveform component, e.g., at least an order of magnitude greater. For example, the probing waveform component can have a frequency on the order of several Hz, and the excitation waveform component can have a frequency on the order of several kHz. Example frequencies for the probing waveform component include, without limitation, 0.5 Hz to 100 Hz inclusive, 1 Hz to 10 Hz inclusive, 2 Hz to 7 Hz inclusive, and about 5 Hz. Example frequencies for the excitation waveform component include, without limitation, 1 kHz to 100 kHz inclusive, 5 kHz to 50 kHz inclusive, 10 kHz to 30 kHz inclusive, and about 20 kHz.

Figures 3A, 3B, 3C:
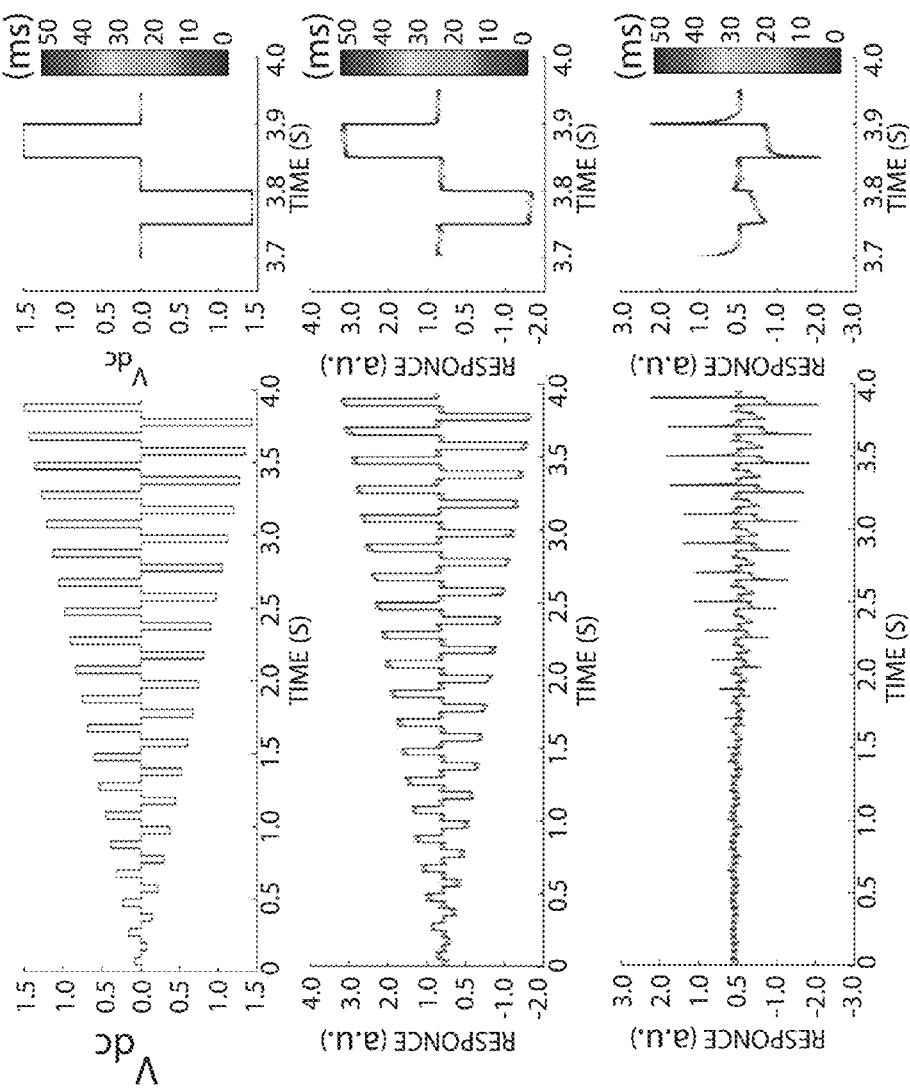
FIGS. 3(a)-3(c) illustrate an excitation signal applied to a cantilever tip electrode and the first harmonic mixed response recorded in air and water.

Measuring the force response induced on the electrode 12 includes measuring the bias-dependent and time-dependent response at a single point of the solid-liquid interface. FIG. 3(a) is illustrative, and includes a single frequency excitation waveform component (20 kHz) applied to the tip 16 while positive, negative, and zero biases are applied to the tip 16 as a bipolar first order reversal curve probing waveform component (5 Hz). FIG. 3(b) depicts the first harmonic mixed response recorded 50 nm above an Au electrode in air, indicating the substantial absence of a dynamic response. FIG. 3(c) depicts the first harmonic mixed response recorded 50 nm above an Au electrode in milliQ water, indicating the presence of a dynamic response. For example, the amplitude of the response in milliQ water was nominal for a bias less than 0.75V, generally corresponding to less than 1.5 seconds in FIG. 3(a). The amplitude of the response becomes non-trivial for biases greater than 0.75V, as generally shown in FIG. 3(c). The amplitude of the response changed over time, as shown in FIG. 3(c) at right, indicative of the electrochemical relaxation processes in the system.

Figure 4A:
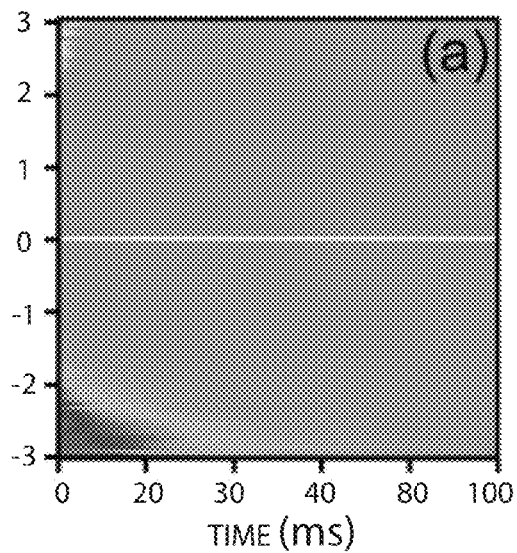
FIGS. 4(a)-4(d) illustrate two-dimensional spectra for the first and second harmonic responses for highly oriented pyrolytic graphite (HOPG) and Au.
Figure 4B:
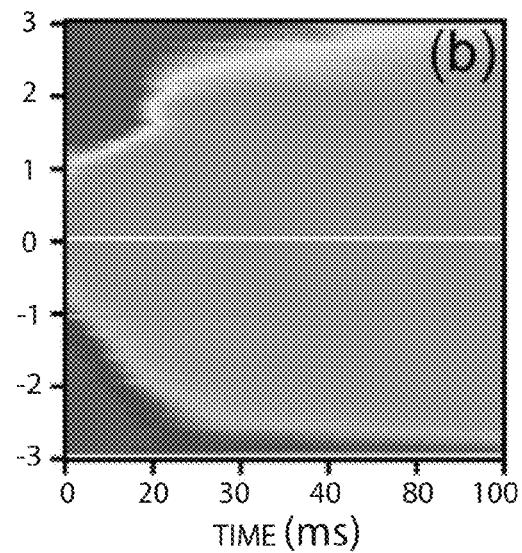
Figure 4C:
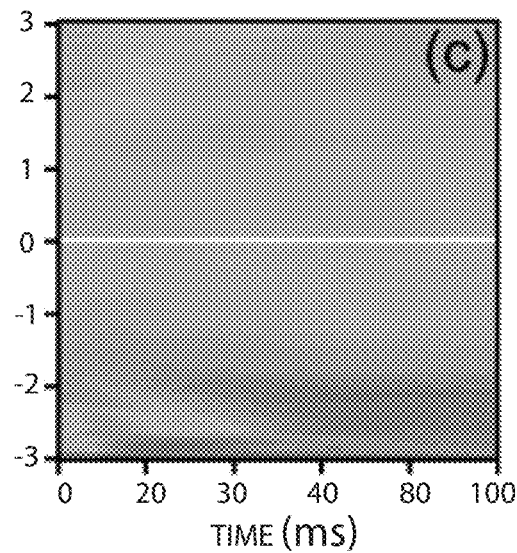
Figure 4D:
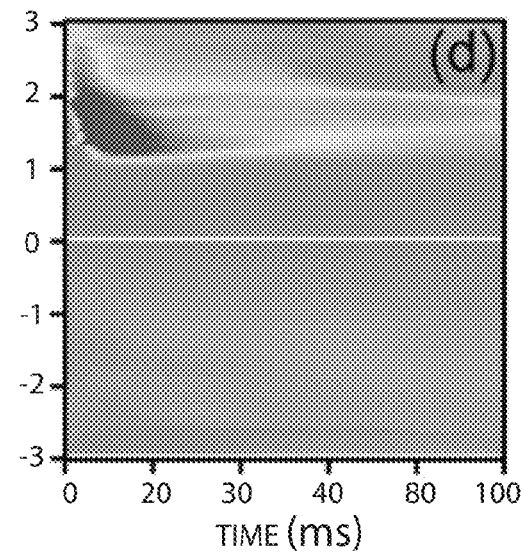

The response can be represented as a two-dimensional bias and time spectra. For example, FIG. 4(a)-(d) includes two-dimensional spectra collected during the bias-on state for first and second harmonic responses for both highly oriented pyrolytic graphite (HOPG) and Au in milliQ water, demonstrating material dependent variability in the recorded signal. The time scale corresponds to the time period after the onset of the bias-on excitation signal, i.e., the first 100 ms after the onset of each bias voltage {−3, −2, −1, 0, 1, 2, 3}. The first harmonic response (vertical grey scale±3V) is shown in FIG. 4(a) for HOPG and FIG. 4(b) for Au. The second harmonic response (vertical grey scale 0 to 4 V) is shown in FIG. 4(c) for HOPG and FIG. 4(d) for Au.

The response can be acquired at each location of a dense spatial grid in order to construct an image of spatial variability. When operated in spectroscopy mapping mode, for example, the electrochemical force microscopy measurements are four dimensional (X, Y, V, t). The electrochemical force microscopy measurements also facilitate evaluation of relaxation processes and the separation of different ion dynamics and electrochemical processes as the tip 16 is scanned along an X-Y grid.

The above method steps are generally performed by the controller module 14. That is, the controller module 14 includes a signal analysis module 34 having instructions in computer readable memory that, when executed, cause the controller module 14 to determine a force response induced on the electrode 12, the force response including the bias and time dependent local response from sample-tip interactions. Once the force response is determined, the signal analysis module 34 can generate a two-dimensional output (V, t) for each of a plurality of points at the solid-liquid interface. For example, the output can include a two-dimensional bias and time spectra as described above in connection with FIGS. 4(a)-(d). The output can also be provided for analysis according to multivariate statistical methods and other statistical methods for evaluating the response mechanism of the electrochemical force microscopy system.

EXAMPLE

The boundary between Au and $SiO_2$ in milliQ water was examined in the following example, which is intended to be non-limiting.

An excitation signal was applied to an electrode over an underlying Au sample and $SiO_2$ sample in milliQ water. The excitation signal included a 20 kHz excitation waveform component and a bipolar first order reversal curve probing waveform component. Deflection of the force-responsive electrode was measured according to existing AFM spectroscopic techniques. The two-dimensional bias-dependent and time-dependent spectroscopic response was recorded at specified locations in a 50×20 grid across the Au/$SiO_2$ boundary. Cross sections of the first harmonic mixed response was averaged over the regions indicated in FIG. 5(a) (vertical grey scale±40 nm, scale bar=5 μm, image size 40×10 μm) and are shown in FIGS. 5(b) and 5(c) for Au and $SiO_2$, respectively (data ranges from −1.5V to +1.5V in steps of 75 mV, lift height=500 nm). For FIGS. 5(b) and 5(c), the response is presented as a function of time for each bias applied. That is, the observed spatial variation across the Au/$SiO_2$ boundary is depicted for all biases and times in FIGS. 5(b) and 5(c). To demonstrate the spatial variability of the bias and time dependence of the response, the data is plotted in FIG. 5(d) and FIG. 5(e) from a grid of 50×20 with measurements of the first harmonic mixed response recorded 5 ms after the onset of the +1.5V and −1.5V bias pulses, respectively (vertical color scale±1.5 a.u.).

Figure 6A:
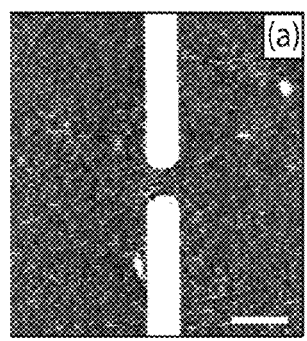
FIGS. 6(a)-6(f) illustrate the topography of an AU electrode on a SiO$_2$ substrate as imaged using contact mode AFM in milliQ water and related data sets for examining the spatial variability of bias-dependent and time-dependent responses.
Figure 6B:
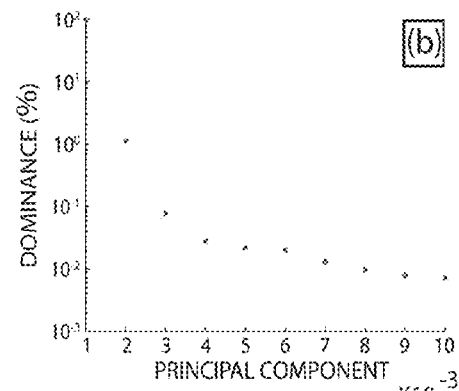
Figure 6C:
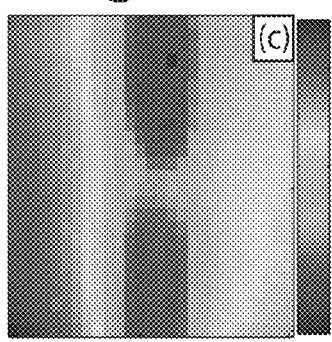
Figure 6D:
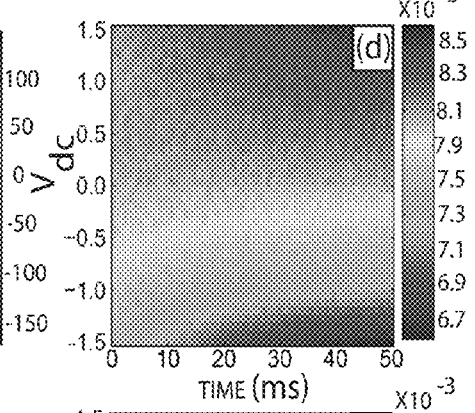
Figure 6E:
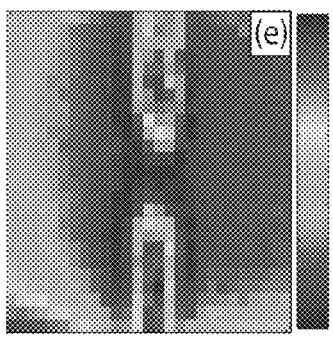
Figure 6F:
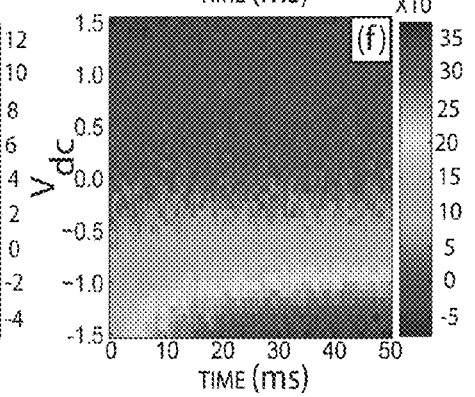

In the aforementioned example, the presence of the spatially-dependent contrast demonstrates that the electrochemical force microscopy response is localized and dependent upon the material below the electrode tip. Multivariate statistical approaches such as principle component analysis can be used to study spatial variability within datasets, as demonstrated in FIGS. 6(a)-(f). More particularly, FIG. 6(a) illustrates the topography of an Au electrode deposited on a $SiO_2$ substrate and imaged using contact mode AFM in milliQ water. Electrodes were electrically floating with respect to the tip. FIG. 6(b) illustrates dominance of the variation in response with respect to the principle component number. The principle component loading maps (c,e) and eigenvectors (d,f) are determined for a 25×25 grid showing variation in the first (c,d) and second (e,f) harmonic amplitude responses.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z; and Y, Z.

REFERENCES

1. Kwak, Juhyoun, Allen J. Bard, and Fu-Ren F. Fan., "Scanning Electrochemical Microscopy", U.S. Pat. No. 5,202,004, 13 Apr. 1993.
2. Bazant, M. Z., Thornton, K. & Ajdari, A., "Diffuse-Charge Dynamics in Electrochemical Systems", *Phys. Rev. E* 70, 021506 (2004).
3. Bazant, M. Z., Kilic, M. S., Storey, B. D. & Ajdari, A., "Nonlinear Electrokinetics at Large Voltages", *New J Phys.* 11, 075016 (2009).
4. Bazant, M. Z., Kilic, M. S., Storey, B. D. & Ajdari, A., "Towards an Understanding of Induced-Charge Electrokinetics at Large Applied Voltages in Concentrated Solutions", *Adv. Colloid Interface Sci.* 152, 48-88 (2009).
5. Rodriguez, B. J., Callahan, C. Kalinin, S. V. & Proksch, R., Dual-Frequency Resonance-Tracking Atomic Force Microscopy. *Nanotechnology* 18, 475504 (2007).
6. Rodriguez, B. J., Jesse, S., Meunier, V. & Kalinin, S. V., Scanning Frequency Mixing Microscopy of High-Frequency Transport Behavior at Electroactive Interfaces. *Appl. Phys. Lett.* 88, 143128-143128-143123 (2006).
7. Platz, D., Tholen, E. A., Pesen, D. & Haviland, D. B., "Intermodulation Atomic Force Microscopy", *Appl. Phys. Lett.* 92, 153106-153106-153103 (2008).
8. Jesse, S., Kalinin, S. V., Proksch, R., Baddorf, A. & Rodriguez, B., "The Band Excitation Method in Scanning Probe Microscopy for Rapid Mapping of Energy Dissipation on the Nanoscale", *Nanotechnology* 18, 435503 (2007).
9. Guo, S., Kalinin, S. V. & Jesse, S., "Half-Harmonic Kelvin Probe Force Microscopy with Transfer Function Correction", *Appl. Phys. Lett.* 100, 063118-063118-063114 (2012).

The invention claimed is:

1. A method of mapping dynamic charge screening, ionic diffusion, or electrochemical reactivity comprising:
providing an electrode separated by a distance from a sample material and in electrical communication with the sample material through an electrolyte solution;
applying an excitation voltage to the electrode to establish an electrical potential between the electrode and the sample material, the excitation voltage including a probing waveform component and an excitation waveform component superimposed thereon, wherein the probing waveform component includes a carrier waveform having a bias-on state and a bias-off state to elicit diffusion or faradaic reactions at the sample material, and wherein the excitation waveform component includes a frequency greater than a frequency of the probing waveform component to elicit double layer charging or charge relaxation at the sample material, the frequency of the excitation waveform component being between 5 kHz to 50 kHz inclusive, and the frequency of the probing waveform component being between 1 Hz to 10 Hz inclusive; and
measuring a force response induced on the electrode by the electrical potential, the force response including the bias and time dependent local response of the sample material.

2. The method according to claim 1 further including generating a two-dimensional spectra including the bias and time dependent local response of the sample material.

3. The method according to claim 1 wherein the electrode includes a cantilever having a current conductive tip.

4. The method according to claim 3 wherein measuring a force response includes detecting the deflection of the cantilever.

5. The method according to claim 1 wherein the probing waveform component includes a unipolar first order reversal curve or a bipolar first order reversal curve.

6. The method according to claim 1 wherein the excitation waveform component includes a periodic waveform having a fixed frequency operating at resonance.

7. The method according to claim 1 wherein the probing waveform component includes a bias that varies over time.

8. The method according to claim 6 wherein measuring the force response includes measuring the force response as a function of the bias of the probing waveform component.

9. A system for mapping dynamic charge screening, ionic diffusion, or electrochemical reactivity comprising:
a current conductive cantilever, the cantilever being separated by a sample material through an electrolyte solution;
a signal generator operable to provide an excitation signal to the cantilever, the excitation signal including a probing waveform component and an excitation waveform component, wherein the probing waveform component includes a carrier waveform having a bias-on state and a bias-off state to elicit diffusion or faradaic reactions at the sample material, and wherein the excitation waveform component includes a frequency greater than a frequency of the probing waveform component to elicit double layer charging or charge relaxation at the sample material, the frequency of the excitation waveform component being between 5 kHz to 50 kHz inclusive, and the frequency of the probing waveform component being between 1 Hz to 10 Hz inclusive, the excitation signal inducing an electrical potential between the electrode and the sample material;
a force detection sensor operable to measure the deflection of the cantilever over time; and a signal analysis module operable to determine, based on the output of the force detection sensor, a response of the cantilever as a function of a magnitude of the probing waveform and as a function of time.

10. The system of claim 9 wherein the force detection sensor includes a laser and an optical detector to detect laser light reflected from the current conductive cantilever.

11. The system of claim 9 wherein the probing waveform component includes a time-varying magnitude.

12. The system of claim 11 wherein the probing waveform component includes a unipolar first order reversal curve or a bipolar first order reversal curve.

13. The system of claim 9 wherein the excitation waveform component includes a periodic waveform having a fixed frequency operating at resonance.

14. A method of mapping dynamic charge screening, ionic diffusion, or electrochemical reactivity comprising:
provic an electrode separated by a distance from a sample material and in electrical communication with the sample material through an electrolyte solution;
establishing an electrical potential between the electrode and the sample material, the electrical potential being induced by an excitation voltage applied to the electrode or to the sample material, the excitation signal including a probing waveform component and an excitation waveform component, wherein the probing waveform component includes a carrier waveform having a bias-on state and a bias-off state to elicit diffusion or faradaic reactions at the sample material, and wherein the excitation waveform component includes a frequency greater than a frequency of the probing waveform component to elicit double layer charging or charge relaxation at the sample material, the frequency of the excitation waveform component being between 5 kHz to 50 kHz inclusive, and the frequency of the probing waveform component being between 1 Hz to 10 Hz inclusive; and
measuring a force response induced on the electrode by the electrical potential, the force response including the bias and time dependent local response of the sample material.

15. The method according to claim 14 wherein the electrode includes a probe having a cantilever and a current conductive tip.

16. The method according to claim 15 wherein measuring a force response includes detecting the deflection of the cantilever.

17. The method according to claim 14 wherein the probing waveform component includes a bias that varies over time.

18. The method according to claim 17 wherein measuring the bias response includes measuring the force response as a function of the bias of the probing waveform component.

19. The method according to claim 14 wherein the probing waveform component includes a unipolar first order reversal curve or a bipolar first order reversal curve.

20. The method according to claim 14 further including generating a two-dimensional spectra including the bias and time dependent local response of the sample material.

* * * * *